No. 719,131. PATENTED JAN. 27, 1903.
E. D. PARKER.
CHERRY SEEDER.
APPLICATION FILED MAY 12, 1902.

NO MODEL.

WITNESSES:
F. Llewellyn Walker
Clifton P. Grant

INVENTOR
Edwin D. Parker
BY Staley T. Bowman
ATTORNEYS

UNITED STATES PATENT OFFICE.

EDWIN D. PARKER, OF SPRINGFIELD, OHIO.

CHERRY-SEEDER.

SPECIFICATION forming part of Letters Patent No. 719,131, dated January 27, 1903.

Application filed May 12, 1902. Serial No. 106,884. (No model.)

*To all whom it may concern:*

Be it known that I, EDWIN D. PARKER, a citizen of the United States, residing at Springfield, in the county of Clark and State of Ohio, have invented certain new and useful Improvements in Cherry-Seeders, of which the following is a specification.

My invention relates to a fruit stoner or seeder to remove the stone or seed from cherries, plums, and like fruits.

The object of my invention is to provide a simple and efficient implement, light in construction, consisting of few parts, not liable to get out of order, that may be easily operated by hand to remove the seed.

My invention consists of the constructions and combinations hereinafter described, and set forth in the claims.

Figure 1:
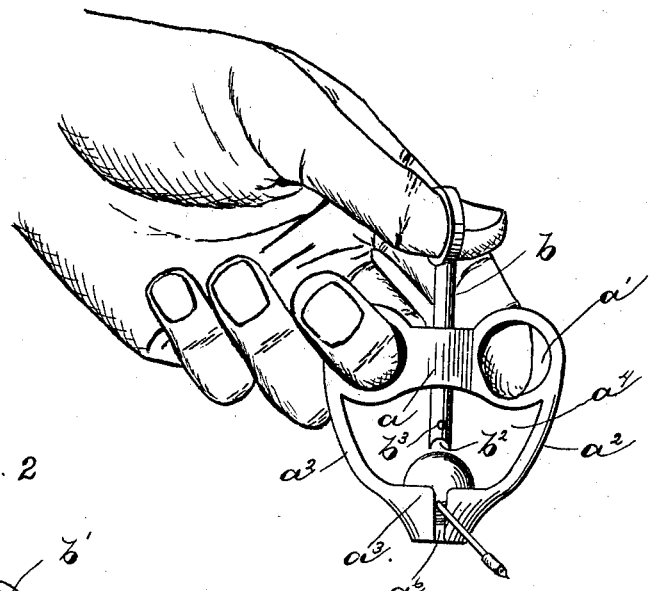
Figure 2:
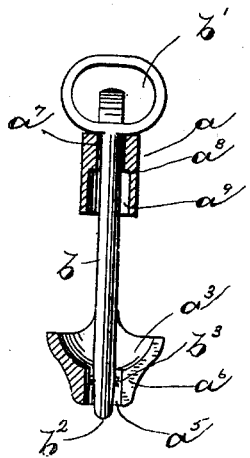

In the accompanying drawings, which form a part of this specification, Figure 1 is a perspective view of my device, showing the cherry in place ready to be seeded; and Fig. 2 is a vertical section of same.

Like parts are represented by similar letters of reference in both views.

I preferably form the frame or body in one piece, consisting of the horizontal portion $a$, having the finger-holes $a'$ at a suitable distance from each other to be held by any two fingers of the hand, Fig. 1 showing it held by the first and second fingers. This horizontal portion $a$ has the extended sides $a^2$ inclined toward each other, terminating in the bowl $a^3$, which holds the cherry to be seeded, and the space or opening $a^4$ through the frame gives a light construction and ready access to the bowl. The bowl is provided with the opening $a^5$ for the discharge of the seed and has the slot $a^6$, so that the stem may pass with the seed. The pitter or plunger $b$ is formed at its outer end with the thumb-hole $b'$, and its inner end $b^2$ is grooved or concave, forming sharp edges to cut the fruit and also to center and hold the seed when it is forced through the fruit. The perforation $a^7$ in the body forms a guide for the plunger, and the cross-pin $b^3$ in the plunger forms a stop to hold the plunger within the frame, the pin contacting with the shoulder $a^8$ of the recess $a^9$, said recess being of sufficient depth to permit the pitter to be drawn up so that its cutting end will be flush with the inner edge of the portion $a$ of the frame, and thus being completely out of the way when fruit is being placed in the bowl.

The device is operated by grasping the frame with two fingers and the pitter or plunger with the thumb of one hand, lifting the plunger with the thumb, and the cherry, plum, or other fruit being placed in the bowl with the stem extending through the slot the plunger is operated, carrying the seed through the opening in the bottom of the bowl, the stem passing with it through the slot.

It will be seen that by providing a light construction with the finger-holes in the carrying-frame and the thumb-hole in the pitter the device is easily held and operated by one hand without the use of springs or other means.

Having thus described my invention, I claim—

1. In a hand-seeder, the combination with a frame having finger-holes therein and a fruit-holding bowl having a seed-discharge, said frame and bowl being connected so as to leave an open space above said bowl, of a pitter slidingly mounted in said frame in line with said seed-discharge, having a thumb-hole in its outer end to operate said pitter, substantially as specified.

2. A two-part hand-seeder, one part consisting of a horizontal portion having finger-holes therein and laterally-extending arms terminating in a fruit-holding bowl, said bowl having an opening therein for the discharge of the seed, and a slot in the side thereof for the passage of the stem, a pitter slidingly mounted in said horizontal portion in line with the discharge-opening in said bowl, having a thumb-hole in its outer end and a concave on its inner end, forming sharp edges to cut the fruit and center and hold the seed while being pressed out, substantially as specified.

In testimony whereof I have hereunto set my hand this 8th day of May, A. D. 1902.

EDWIN D. PARKER.

Witnesses:
 CHAS. I. WELCH,
 CLIFTON P. GRANT.